(12) United States Patent
Meyer et al.

(10) Patent No.: US 6,176,803 B1
(45) Date of Patent: Jan. 23, 2001

(54) TRANSMISSION ASSEMBLY WITH FOUR PLANETARY GEAR SETS PROVIDING NINE FORWARD AND ONE REVERSE GEAR RATIO

(75) Inventors: Kevin G. Meyer, Metamora; Roy T. Paluska, Jr., Washington, both of IL (US)

(73) Assignee: Caterpillar Inc., Peoria, IL (US)

( * ) Notice: Under 35 U.S.C. 154(b), the term of this patent shall be extended for 0 days.

(21) Appl. No.: 09/407,392

(22) Filed: Sep. 28, 1999

(51) Int. Cl.⁷ ..................................................... F16H 57/10
(52) U.S. Cl. ........................... 475/286; 475/290; 475/276
(58) Field of Search ..................................... 475/286, 290, 475/296, 319, 325, 276, 275, 280, 284

(56) References Cited

U.S. PATENT DOCUMENTS

| | | | |
|---|---|---|---|
| 3,548,665 | 12/1970 | Crooks | 74/15.63 |
| 3,815,445 | * 6/1974 | Gorrell et al. | 475/286 |
| 3,996,817 | 12/1976 | Winzeler | 74/765 |
| 4,038,887 | * 8/1977 | Murakami et al. | 475/276 |
| 4,046,031 | 9/1977 | Ott et al. | 74/764 |
| 4,070,927 | 1/1978 | Polak | 74/765 |
| 4,228,697 | * 10/1980 | Miller | 475/276 |
| 4,531,428 | 7/1985 | Windish | 74/765 |
| 4,683,776 | 8/1987 | Klemen | 74/765 |
| 5,226,862 | * 7/1993 | Hattori | 475/286 |
| 5,301,564 | 4/1994 | Muller et al. | 74/333 |
| 5,916,050 | 6/1999 | Coutant et al. | 475/5 |

FOREIGN PATENT DOCUMENTS

| | | | |
|---|---|---|---|
| 2721719 | * 12/1977 | (DE) | 475/286 |
| 1308003 | 2/1973 | (GB) | F16H/3/66 |
| 1308009 | 2/1973 | (GB) | F16H/3/66 |
| 1432883 | 4/1976 | (GB) | F16H/3/66 |
| 1379524 | * 3/1988 | (SU) | 475/286 |

* cited by examiner

Primary Examiner—Richard M. Lorence
Assistant Examiner—Ha Ho
(74) Attorney, Agent, or Firm—John W. Morrison

(57) ABSTRACT

A transmission assembly having a first, a second, a third, and a fourth planetary gear set is disclosed. The transmission assembly further includes an input shaft which drives the sun gear of the first planetary gear set, a first member which connects the planet carrier of the third planetary gear set and the ring gear of the fourth planetary gear set, and a second member which connects the sun gear of the third planetary gear set to the sun gear of the fourth planetary gear set. The transmission assembly yet further includes a third member which connects the ring gear of the first planetary gear set to (i) the planet carrier of the second planetary gear set and (ii) the ring gear of the third planetary gear set. The transmission assembly still further includes a fourth member which connects the planet carrier of the first planetary gear set to the sun gear of the second planetary gear set and an output shaft driven the planet carrier of the fourth planetary gear set. The transmission assembly yet further includes (i) a first clutch between the input shaft and the second member, (ii) a second clutch between the input shaft and the first member, (iii) a third clutch between the fourth member and the housing, (iv) a fourth clutch between the ring gear of the second planetary gear set and the housing, (v) a fifth clutch between the third member and the housing, and (vi) a sixth clutch between the first member and the housing.

11 Claims, 2 Drawing Sheets

Fig-2-

| GEAR | CLUTCHES ENGAGED | RATIO |
|---|---|---|
| R | 3 & 6 | −4.46 |
| 1 | 4 & 6 | 5.728 |
| 2 | 1 & 6 | 3.576 |
| 3 | 1 & 4 | 2.719 |
| 4 | 1 & 5 | 1.948 |
| 5 | 1 & 3 | 1.429 |
| 6 | 1 & 2 | 1.000 |
| 7 | 2 & 3 | .7353 |
| 8 | 2 & 5 | .6313 |
| 9 | 2 & 4 | .5686 |

US 6,176,803 B1

TRANSMISSION ASSEMBLY WITH FOUR PLANETARY GEAR SETS PROVIDING NINE FORWARD AND ONE REVERSE GEAR RATIO

TECHNICAL FIELD

The present invention relates generally to a transmission assembly, and more specifically to a transmission assembly with four planetary gear sets providing nine forward gear ratios and one reverse gear ratio.

BACKGROUND ART

Planetary transmissions are used in applications where strength and durability are required. One such transmission application is in work machines used for earth moving and other heavy duty applications. The strength of the planetary transmission is provided by having multiple planet gears intermeshed with the ring gear and sun gear of each planetary gear set. The multiple planet gears allow higher torque levels to be transmitted than would be possible using single gears as there is greater contact area between the intermeshed gears. Also, since the planet gears are evenly spaced about a planet carrier, the load from the planet gears is more evenly spread around the ring gear of the planetary gear set thereby further increasing the durability of planetary gear sets as compared to other gearing configurations.

For many work machines, it is desirable to have a large number of gear ratios so that the work machine can operate over a wide range of speeds while maintaining the engine in a narrow speed range which delivers maximum torque. The simplest means to provide a large number of gear ratios using planetary gear sets is to have a planetary gear set for each of the desired gear ratios. However, there are a couple of drawbacks to using a large number of planetary gear sets. The first drawback is the high cost associated with a large number of the planetary gear sets. The second drawback is that the greater contact area between the gears of the planetary gear set results in higher frictional losses as power is transmitted through the transmission, thus, reducing the overall efficiency of the transmission.

What is needed therefore is planetary transmission which overcomes the above-mentioned drawbacks.

DISCLOSURE OF THE INVENTION

In accordance with a first embodiment of the present invention, there is provided a transmission assembly having a housing, a first planetary gear set with double planet gears, a second, a third, and a fourth planetary gear each with single planet gears. The transmission assembly further includes an input shaft which drives the sun gear of the first planetary gear set, a first member which connects the planet carrier of the third planetary gear set and the ring gear of the fourth planetary gear set, and a second member which connects the sun gear of the third planetary gear set to the sun gear of the fourth planetary gear set. The transmission assembly yet further includes a third member which connects the ring gear of the first planetary gear set to (i) the planet carrier of the second planetary gear set and (ii) the ring gear of the third planetary gear set. The transmission assembly still further includes a fourth member which connects the planet carrier of the first planetary gear set to the sun gear of the second planetary gear set and an output shaft driven by the planet carrier of the fourth planetary set. The transmission assembly yet further includes (i) a first clutch between the input shaft and the second member, (ii) a second clutch between the input shaft and the first member, (iii) a third clutch between the fourth member and the housing, (iv) a fourth clutch between the ring gear of the second planetary gear set and the housing, (v) a fifth clutch between the third member and the housing, and (vi) a sixth clutch between the first member and the housing.

BRIEF DESCRIPTION OF THE DRAWINGS

FIG. 2 is a table showing the clutches engaged for each gear ratio.

BEST MODE FOR CARRYING OUT THE INVENTION

Figure 1:
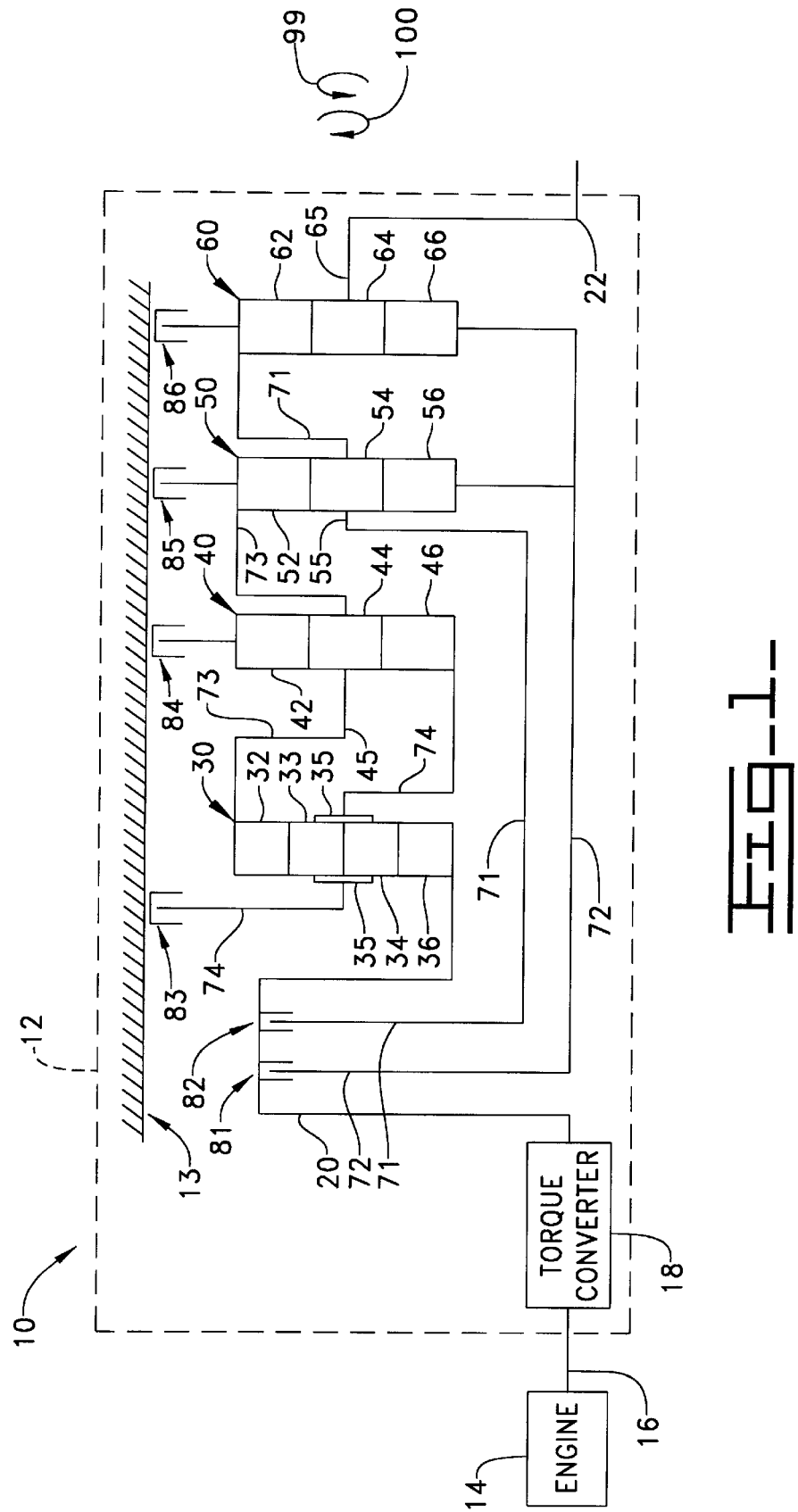
FIG. 1 is a schematic view of a transmission assembly which incorporates the features of the present invention therein.

While the invention is susceptible to various modifications and alternative forms, a specific embodiment thereof has been shown by way of example in the drawings and will herein be described in detail. It should be understood, however, that there is no intent to limit the invention to the particular form disclosed, but on the contrary, the intention is to cover all modifications, equivalents, and alternatives falling within the spirit and scope of the invention as defined by the appended claims.

Referring now to FIG. 1, there is shown a drivetrain assembly 10 used to propel a work machine (not shown). The drivetrain assembly 10 includes an engine 14 and a transmission assembly 12. The engine 14 provides power to the transmission assembly 12 via an engine output shaft 16. The transmission assembly 12 includes a torque converter 18 which multiplies torque from engine input shaft 16 and provides a fluid coupling between the engine 14 and the transmission assembly 12. In particular, the engine output shaft 16 drives the torque converter 18 which in turn transmits power to a transmission input shaft 20.

The transmission assembly 12 further includes a housing 13 which houses the various components of the transmission assembly 12 therein. In particular, the torque converter 18, a first planetary gear set 30, a second planetary gear set 40, a third planetary gear set 50, and a fourth planetary gear set 60 are housed within the housing 13.

The first planetary gear set 30 includes a sun gear 36 having twenty eight, a ring gear 32 having seventy three teeth, and a planet carrier 35 supporting three inner planet gears 34 each having nineteen teeth and three outer planet gears 33 each having nineteen teeth. The outer planetary gears 33 are intermeshed with the inner planetary gears 34. The inner planet gears 34 are further intermeshed with the sun gear 36 whereas the outer planet gear 33 are further intermeshed with the ring gear 32.

The second planetary gear set 40 includes a sun gear 46 having twenty seven teeth, a ring gear 42 having seventy three teeth, and a planet carrier 45 supporting three planet gears 44 each having twenty three teeth. The planet gears 44 are intermeshed with both the sun gear 46 and the ring gear 42.

The third planetary gear set 50 includes a sun gear 56 having thirty five teeth, a ring gear 52 having seventy three teeth, and a planet carrier 55 supporting three planet gears 54 each having nineteen teeth. The planet gears 54 are intermeshed with both the sun gear 56 and the ring gear 52.

The fourth planetary gear set 60 includes a sun gear 66 having twenty eight teeth, a ring gear 62 having seventy two teeth, and a planet carrier 65 supporting three planet gears 64 each having twenty two teeth. The planet gears 64 are intermeshed with both the sun gear 66 and the ring gear 62.

The transmission input shaft 20 drives the sun gear 36 of the first planetary gear set 30. The transmission assembly 12 further includes a first member 71, a second member 72, a third member 73, a fourth member 74, and a transmission output shaft 22. The first member 71 operatively connects the planet carrier 55 of the third planetary gear set 50 and the ring gear 62 of the fourth planetary gear set 60. The second member 72 operatively connects the sun gear 56 of the third planetary gear set 50 to the sun gear 66 of the fourth planetary gear set 60. The third member 73 operatively connects the ring gear 32 of the first planetary gear set 30 to (i) the planet carrier 45 of the second planetary gear set 40 and (ii) the ring gear 52 of the third planetary gear set 50. The fourth member 74 operatively connects the planet carrier 35 of the first planetary gear set 30 to the sun gear 46 of the second planetary gear set 40. The transmission output shaft 22 is driven by the planet carrier 65 of the fourth planetary set 60. The transmission output shaft 22 typically drives differentials (not shown) and final drive (not shown) of the work machine.

The transmission assembly 12 further includes a first clutch 81, a second clutch 82, a third clutch 83, a fourth clutch 84, a fifth clutch 85, and a sixth clutch 86. The first clutch 81 is a rotating clutch which is operative to selectively engage the input shaft 20 with the second member 72. When the first clutch 81 is engaged, the second member 72 rotates in the general direction of arrow 100 as the transmission input shaft 20 is driven in the general direction of arrow 100 by the engine 14. It should be appreciated that engaging the first clutch 81 further causes the sun gear 56 of the third planetary gear set 50 and the sun gear 66 of the fourth planetary gear set 60 to rotate in the general direction of arrow 100 as the input shaft 20 rotates in the general direction of arrow 100.

The second clutch 82 is also a rotating clutch operative to selectively engage the input shaft 20 with the first member 71. When the second clutch 82 is engaged, the first member 71 rotates in the general direction of arrow 100 as the transmission input shaft 20 is driven in the general direction of arrow 100 by the engine 14. It should be appreciated that engaging the second clutch 82 further causes the planet carrier 55 of the third planetary gear set 50 and the ring gear 62 of the fourth planetary gear set 60 to rotate in the general direction of arrow 100 as the input shaft 20 rotates in the general direction of arrow 100.

The third clutch 83 is a stationary clutch operative to selectively engage the fourth member 74 with the housing 13. When the third clutch 83 is engaged, the fourth member 74 is prevented from rotating as the transmission input shaft 20 is driven in the general direction of arrow 100 by the engine 14. It should be appreciated that engaging the third clutch 83 further prevents rotation of (i) the planet carrier 35 of the first planetary gear set 30 and (ii) the sun gear 46 of the second planetary gear set 40 as the input shaft 20 rotates in the general direction of arrow 100.

The fourth clutch 84 is a stationary clutch operative to selectively engage the ring gear 42 of the second planetary gear set 40 with the housing 13. When the fourth clutch 84 is engaged, the ring gear 42 of the second planetary gear set 40 is prevented from rotating as the transmission input shaft 20 is driven in the general direction of arrow 100 by the engine 14.

The fifth clutch 85 is a stationary clutch operative to selectively engage the third member 73 with the housing 13. When the fifth clutch 85 is engaged, the third member 73 is prevented from rotating as the transmission input shaft 20 is driven in the general direction of arrow 100 by the engine 14. It should be appreciated that engaging the fifth clutch 85 further prevents rotation of (i) the ring gear 32 of the first planetary gear set 30, (ii) the planet carrier 45 of the second planetary gear set 40, and (iii) the ring gear 52 of the third planetary gear set 50 as the input shaft 20 rotates in the general direction of arrow 100.

The sixth clutch 86 is a stationary clutch operative to engage the first member 71 to the housing 13. When the sixth clutch 86 is engaged, the first member 73 is prevented from rotating as the transmission input shaft 20 is driven in the general direction of arrow 100 by the engine 14. It should be appreciated that engaging the sixth clutch 86 further prevents rotation of (i) the ring gear 62 of the fourth planetary gear set 60 and (ii) the planet carrier 55 of the third planetary gear set 50.

Industrial Applicability

Referring now to FIG. 2, during operation of the work machine it is desirable to select a number of gear ratios to match the power output of the engine 14 to a given load condition.

To select a reverse gear ratio, the third clutch 83 and the sixth clutch 86 are engaged. Selecting the reverse gear ratio provides an overall gear ratio of approximately 4.46 in the reverse direction such that 4.46 revolutions of the transmission input shaft 20 in the general direction of arrow 100 produces a single rotation of the output shaft 22 in the general direction of arrow 99.

To select a first forward gear ratio, the fourth clutch 84 and the sixth clutch 86 are engaged. Selecting the first gear ratio provides an overall gear ratio of approximately 5.73 in the forward direction such that 5.73 revolutions of the transmission input shaft 20 in the general direction of arrow 100 produces a single rotation of the transmission output shaft 22 in the general direction of arrow 100. It should be appreciated that the shift from the reverse gear ratio to the first forward gear ratio is a single clutch shift whereby a single clutch, the third clutch 83, is disengaged and a single clutch, the fourth clutch 84, is engaged.

To select a second forward gear ratio, the first clutch 81 and the sixth clutch 86 are engaged. Selecting the second forward gear ratio provides an overall gear ratio of approximately 3.57 in the forward direction such that 3.57 revolutions of the transmission input shaft 20 in the general direction of arrow 100 produces a single rotation of the transmission output shaft 22 in the general direction of arrow 100. It should be appreciated that the shift from the first forward gear ratio to the second forward gear ratio is a single clutch shift whereby a single clutch, the fourth clutch 84, is disengaged and a single clutch, the first clutch 81, is engaged.

To select a third forward gear ratio, the first clutch 81 and the fourth clutch 84 are engaged. Selecting the third forward gear ratio provides an overall gear ratio of approximately 2.72 in the forward direction such that 2.72 revolutions of the transmission input shaft 20 in the general direction of arrow 100 produces a single rotation of the transmission output shaft 22 in the general direction of arrow 100. It should be appreciated that the shift from the second forward gear ratio to the third forward gear ratio is a single clutch shift whereby a single clutch, the sixth clutch 86, is disengaged and a single clutch, the fourth clutch 84, is engaged.

To select a fourth forward gear ratio, the first clutch 81 and the fifth clutch 85 are engaged. Selecting the fourth forward gear ratio provides an overall gear ratio of approximately 1.95 in the forward direction such that 1.95 revolutions of the transmission input shaft 20 in the general direction of arrow 100 produces a single rotation of the transmission output shaft 22 in the general direction of arrow 100. It should be appreciated that the shift from the third forward gear ratio to the fourth forward gear ratio is a single clutch shift whereby a single clutch, the fourth clutch 84, is disengaged and a single clutch, the fifth clutch 85, is engaged.

To select a fifth forward gear ratio, the first clutch 81 and the third clutch 83 are engaged. Selecting the fifth forward gear ratio provides an overall gear ratio of approximately 1.43 in the forward direction such that 1.43 revolutions of the transmission input shaft 20 in the general direction of arrow 100 produces a single rotation of the transmission output shaft 22 in the general direction of arrow 100. It should be appreciated that the shift from the fourth forward gear ratio to the fifth forward gear ratio is a single clutch shift whereby a single clutch, the fifth clutch 85, is disengaged and a single clutch, the third clutch 83, is engaged.

To select a sixth forward gear ratio, the first clutch 81 and the second clutch 82 are engaged. Selecting the sixth forward gear ratio provides an overall gear ratio of 1.00 in the forward direction such that 1.00 revolutions of the transmission input shaft 20 in the general direction of arrow 100 produces a single rotation of the transmission output shaft 22 in the general direction of arrow 100. It should be appreciated that the shift from the fifth forward gear ratio to the sixth forward gear ratio is a single clutch shift whereby a single clutch, the third clutch 83, is disengaged and a single clutch, the second clutch 82, is engaged.

To select a seventh forward gear ratio, the second clutch 82 and the third clutch 83 are engaged. Selecting the seventh forward gear ratio provides an overall gear ratio of 0.735 in the forward direction such that 0.735 revolutions of the transmission input shaft 20 in the general direction of arrow 100 produces a single rotation of the transmission output shaft 22 in the general direction of arrow 100. It should be appreciated that the shift from the sixth forward gear ratio to the seventh forward gear ratio is a single clutch shift whereby a single clutch, the first clutch 81, is disengaged and a single clutch, the third clutch 83, is engaged.

To select an eighth forward gear ratio, the second clutch 82 and the fifth clutch 85 are engaged. Selecting the eighth forward gear ratio provides an overall gear ratio of 0.631 in the forward direction such that 0.631 revolutions of the transmission input shaft 20 in the general direction of arrow 100 produces a single rotation of the transmission output shaft 22 in the general direction of arrow 100. It should be appreciated that the shift from the seventh forward gear ratio to the eighth forward gear ratio is a single clutch shift whereby a single clutch, the third clutch 83, is disengaged and a single clutch, the fifth clutch 85, is engaged.

To select a ninth forward gear ratio, the second clutch 82 and the fourth clutch 84 are engaged. Selecting the ninth forward gear ratio provides an overall gear ratio of 0.569 in the forward direction such that 0.569 revolutions of the transmission input shaft 20 in the general direction of arrow 100 produces a single rotation of the transmission output shaft 22 in the general direction of arrow 100. It should be appreciated that the shift from the eighth forward gear ratio to the ninth forward gear ratio is a single clutch shift whereby a single clutch, the fifth clutch 85, is disengaged and a single clutch, the third clutch 83 is engaged.

While the invention has been illustrated and described in detail in the drawings and foregoing description, such illustration and description is to be considered as exemplary and not restrictive in character, it being understood that only the preferred embodiment has been shown and described and that all changes and modifications that come within the spirit of the invention are desired to be protected.

What is claimed is:

1. A transmission assembly comprising:

a housing;

a first planetary gear set including a sun gear, a ring gear, and a planet carrier supporting a number of inner planet gears intermeshed with a number of outer planet gears, said inner planet gears being further intermeshed with said sun gear and said outer planet gears being further intermeshed with said ring gear;

a second, a third, and a fourth planetary gear sets each gear set including a sun gear, a ring gear, and a planet carrier supporting a number of planet gears intermeshed with, a respective said sun gear and said ring gear;

an input shaft which drives said sun gear of said first planetary gear set;

a first member which connects said planet carrier of said third planetary gear set and said ring gear of said fourth planetary gear set;

a second member which connects said sun gear of said third planetary gear set to said sun gear of said fourth planetary gear set;

a third member which connects said ring gear of said first planetary gear set to (i) said planet carrier of said second planetary gear set and (ii) said ring gear of said third planetary gear set;

a fourth member which connects said planet carrier of said first planetary gear set to said sun gear of said second planetary gear set a transmission output shaft driven by said planet carrier of said fourth planetary set;

a first clutch which is operative to selectively engage said input shaft with said second member;

a second clutch which is operative to selectively engage said input shaft with said first member;

a third clutch which is operative to selectively engage said fourth member with said housing;

a fourth clutch which is operative to selectively engage ring gear of said second planetary gear set with said housing;

a fifth clutch which is operative to selectively engage said third member with said housing; and a sixth clutch which is operative to engage said first member to said housing.

2. The assembly of claim 1, wherein a reverse gear ratio is selected by engaging said third clutch and said sixth clutch.

3. The assembly of claim 1, wherein a first forward gear ratio is selected by engaging said fourth clutch and said sixth clutch.

4. The assembly of claim 1, wherein a second forward gear ratio is selected by engaging said first clutch and said sixth clutch.

5. The assembly of claim 1, wherein a third forward gear ratio is selected by engaging said first clutch and said fourth clutch.

6. The assembly of claim 1, wherein a fourth forward gear ratio is selected by engaging said first clutch and said fifth clutch.

7. The assembly of claim 1, wherein a fifth forward gear ratio is selected by engaging said first clutch and said third clutch.

8. The assembly of claim 1, wherein a sixth forward gear ratio is selected by engaging said first clutch and said second clutch.

9. The assembly of claim 1, wherein a seventh forward gear ratio is selected by engaging said second clutch and said third clutch.

10. The assembly of claim 1, wherein an eighth forward gear ratio is selected by engaging said second clutch and said fifth clutch.

11. The assembly of claim 1, wherein a ninth forward gear ratio is selected by engaging said second clutch and said fourth clutch.

* * * * *